US009589467B2

(12) United States Patent
De La Plaza Ortega

(10) Patent No.: US 9,589,467 B2
(45) Date of Patent: Mar. 7, 2017

(54) AUTOMATIC REGULATED PARKING SYSTEM AND METHOD

(71) Applicant: Javier De La Plaza Ortega, Madrid (ES)

(72) Inventor: Javier De La Plaza Ortega, Madrid (ES)

( * ) Notice: Subject to any disclaimer, the term of this patent is extended or adjusted under 35 U.S.C. 154(b) by 0 days.

(21) Appl. No.: 14/411,464

(22) PCT Filed: Jun. 27, 2013

(86) PCT No.: PCT/ES2013/070433
§ 371 (c)(1),
(2) Date: Dec. 26, 2014

(87) PCT Pub. No.: WO2014/006248
PCT Pub. Date: Jan. 9, 2014

(65) Prior Publication Data

US 2015/0294567 A1 Oct. 15, 2015

(30) Foreign Application Priority Data

Jul. 5, 2012 (ES) .................................. 201231054

(51) Int. Cl.
*B60Q 1/48* (2006.01)
*G08G 1/14* (2006.01)

(52) U.S. Cl.
CPC ............ *G08G 1/144* (2013.01); *G08G 1/147* (2013.01); *G08G 1/148* (2013.01)

(58) Field of Classification Search
None
See application file for complete search history.

(56) References Cited

U.S. PATENT DOCUMENTS 4,310,890 A * 1/1982 Trehn ................ G06Q 20/0652 340/932.2
5,266,947 A * 11/1993 Fujiwara ............ G06Q 30/0284 235/377

(Continued)

FOREIGN PATENT DOCUMENTS

WO 93/04453 A1 3/1993
WO 2007/027818 A1 3/2007
WO 2007049144 A1 5/2007

OTHER PUBLICATIONS

International Search Report, Oct. 10, 2013, from International Phase of the instant application.

(Continued)

*Primary Examiner* — Curtis King
(74) *Attorney, Agent, or Firm* — Cahn & Samuels, LLP

(57) ABSTRACT

The invention relates to a system, method and equipments for the control, management and administration of regulated vehicles parking, on public and private roads, in an automatic and integrated manner, where the parked vehicles identification, as well as the parked time control and parking permits, including all related parking incidences, are detected and handled without the need of parking meters or permanent parking wardens, and the information is automatically transmitted to a Management Center, for its processing and administration. The Automatic Regulated Parking System (10) includes: A set of User Devices (11) which communicate with the User Management Center (16) by means of Smart Network Terminals (12), a set Smart Network Terminals (12), a set of network Access Nodes (13), a set of Network Nodes (14), a Network Control Center (15), a User Management Center (16) and a reduced set of Agent Mobile Terminals (17).

16 Claims, 13 Drawing Sheets

Automatic Regulated Parking System (10)

(56) References Cited

U.S. PATENT DOCUMENTS

| | | | |
|---|---|---|---|
| 5,339,000 A | 8/1994 | Bashan et al. | |
| 5,351,187 A * | 9/1994 | Hassett | G06K 7/0008 235/384 |
| 5,365,516 A | 11/1994 | Jandrell | |
| 5,905,247 A * | 5/1999 | Ilen | G07C 1/30 235/381 |
| 6,295,540 B1 | 9/2001 | Sanschagrin et al. | |
| 7,424,968 B2 * | 9/2008 | Meyerhofer | G06Q 20/127 235/375 |
| 8,026,832 B2 * | 9/2011 | Weiss | G06Q 20/10 340/928 |
| 2004/0181495 A1 | 9/2004 | Grush | |
| 2006/0043176 A1 | 3/2006 | Meyerhofer | |
| 2007/0029825 A1 | 2/2007 | Franklin et al. | |
| 2007/0050240 A1 | 3/2007 | Belani et al. | |
| 2008/0270227 A1 | 10/2008 | Al Amri | |
| 2008/0291054 A1 * | 11/2008 | Groft | G06Q 30/0284 340/932.2 |
| 2010/0085214 A1 * | 4/2010 | Kim | G08G 1/14 340/932.2 |
| 2011/0015934 A1 | 1/2011 | Rowe et al. | |
| 2011/0015972 A1 * | 1/2011 | Valdecantos Pardo de Santayana | G07C 1/30 705/13 |
| 2011/0143779 A1 | 6/2011 | Rowe et al. | |
| 2011/0309953 A1 * | 12/2011 | Petite | G01D 4/004 340/932.2 |
| 2012/0092190 A1 | 4/2012 | Stefik et al. | |
| 2012/0130872 A1 | 5/2012 | Baughman et al. | |
| 2012/0286972 A1 * | 11/2012 | Bouzaglo | G06Q 10/00 340/932.2 |
| 2015/0221219 A1 * | 8/2015 | Engelbert | G07B 15/02 340/932.2 |

OTHER PUBLICATIONS

English translation of Written Opinion, International Application PCT/ES2013/070433, dated Oct. 2013.

Comments to Written Opinion of European Search Report dated Dec. 1, 2015.

Communication from EPO, Application No. 13 813 9845, dated Apr. 25, 2016.

* cited by examiner

FIG. 1- Automatic Regulated Parking System (10)

AUTOMATIC REGULATED PARKING SYSTEM AND METHOD

1. DESCRIPTION OF THE INVENTION

1.1 Field of the Invention

The present invention relates to the technical sector of Parking Management Systems on public and private roads, where the parking spaces are not delineated, proposing in this invention an automatic and integrated solution, where are not necessary parking meters neither permanent wardens for the accomplishment of the parking rules and regulations.

1.2 Background of the Invention

One of the major municipality problems, mainly in the big cities, is the vehicles parking. Initially the control and regulation was performed by means of Municipal Policemen, but, from some years, is being performed by permanent wardens belonging to contracted enterprises, on the basis of the deployment of parking meters all over the city streets, where a big number of wardens, by means of a data terminal, are transmitting the vehicle user identification and associated infractions to a Management Centre.

That system approach implies the installation and maintenance of very costly Parking Meters posts and the creation of big personnel staffs, with all the complexity and labour problematic for the contracting enterprises and the compliance of the service guarantee required by the Municipality.

The various Systems are evolving from the paper tickets release, up to RFID tickets and user devices with interaction capacity, in communication with a control centre, based on permanent wardens vigilance.

There are a lot of Invention Patents, dealing with different parking aspects, but it does not exists any automatic and integrated solution for the public/private parking management, with non-delineated neither numbered parking spaces.

In the following are summarised some Systems actually under patent:

1. W05000010MX, it uses a portable device allocated inside the vehicle, in such a way that an agent is able to supervise the identification and control data.

2. 2010/0328104, it is based on a parking meter in communication with a management centre, by means of RF access, with a high position allocated terminal, that accesses by a gateway and internet to a parking management centre. The main objective is the complete management of the parking resources, within a determined area.

3. US2006/0043176, it is oriented to public superficial parking based on the RFID ticket emission, communicating with a central server by LAN access. The parking spaces are delineated, it is performed an automatic control and an agent acts in case of violation.

4. WO02/063570, it is based on the installation of sensors in delineated parking spaces and automatic control of time and spaces.

5. US2006/0255119, it uses a RFID device, communicated with a portable or fixed reader, in connection with a management system for parking permits. It is not specified the time control and the violations shall be detected by an agent with a portable terminal. It includes also a violation execution module based on vehicle blocking.

6. ES2276642, the identification is based on a proprietary RF terminal, in communication with a control centre, by means of a WiFi access, it includes a permanent agent able to interact with the terminal, changing state and operation. Only includes a generic description and the abnormal cases are detected by the agent.

7. ES2008/000306, it is based on the number plate data and a photo by PDA, to be sent to a control centre.

8. WO2006080830, it is based on a card allocated in the vehicle and a portable terminal, for reading directly the card.

9. EP2299409, it is based on a vehicle detector and a remote RFID reader, with delineated individual parking spaces and Internet communication with a control Server and data base. The vehicle detection can be performed by different methods.

10. US20100328104, it consists of a set of parking meters, with vehicle detection loops, transmitting information by a network based on traffic light posts to a control centre. It also provides traffic information by public panels.

11. US2006212344, it is a generic system for general application, using delineated spaces, specifying the various subsystems, where the sensor subsystem may be based on any device without definition of a particular one.

12. EP0952557, it determines the vehicle position comparing, by a mobile on board 70 unit, its location using a parking map, when the vehicle is stopped. An information geographic system processes data and computes the parking cost.

13. CA2417060, it sends the position obtained by GPS, using a GPRS, to a processing centre, that uses parking maps for cost computing.

14. US 20110143779, it is a generic system to provide city services which comprises: a cellular mobile device, sensor nodes and remote servers. Its objective is to inform the Vehicle users, by means of the sensor nodes, about the parking space availability, in order to perform a manual purchase of parking time by the Vehicle driver, using his cellular mobile device. In addition, a sensor allocated on the delineated parking space can send a signal to a camera to indicate the status change in the parking, and to get a picture of the vehicle that can be sent to a remote Server in order to compare with an image base, for the case of infraction.

It is not an automatic system, since it requires the vehicle driver action, in particular for the fundamental operations as to purchase, control and pay the effective parking time. It is not an integrated system, neither is valid for non-delineated spaces, it is only a generic and partial solution, since the parking functions are incomplete and distributed through the various elements.

The RFID option, is a simple RF emitter, which is not integrated in the access subsystem, and without interactive functionality.

The Mobile devices are not associated and integrated in the Vehicle, within an access network, in a Machine to Machine (M2M) context that is required for an automatic and integrated parking service. Such a service shall include from the basic parking functions up to the follow up and information on the vehicle and driver status, operation and security, all along the parking operation as well as during the time that the vehicle is parked.

The sensor nodes have not Network Terminal functions, including at least access control, communication control, vehicle identification, user devices updating, all of them required by the automatic and integrated parking service.

It does not exist a proper network architecture with a global system view, neither an specific control layer for the network services, on the base of a Control Centre, and an specific user control layer, on the basis of a User Management Centre, according to a real time dynamic communication scenario for all System Units. It does not exist an objective of automatic parking, neither the system and units architecture solution, to achieve the performances and service dimensioning of the automatic and integrated parking service required by a city, with a big range of population and type of users.

15. US 20070029825, it is a system and method to detect parking infractions, that is based on an infraction control device, that is carried on a municipal agent vehicle, and that interacts with the parked vehicles, in an area of parking meters associated to delineated and numbered parking spaces. The parking permit may be a RFID tag.

16. U.S. Pat. No. 6,295,540, it is an enhanced network management system, oriented to logging of communications links and related equipment, aimed to utilize in effective way the network resources, but only for the stack physical layer.

17. US 20120130872, it is a parking management method based on the association of payment to a vehicle identifier and an event initiation, within a determinate location.

18. US 20120092190, it is a system and method for the management of parking reservations by means of a server, based on occupation sensors and parking meters with visual information, associated directly to delineated parking spaces.

The present Patent of Invention belongs to a Communication Integrated System for the Automatic Regulated Parking in the Public road, that is also applicable for Private Areas, where the identification of the parked vehicles, as well as the parking time control and the parking permits, including all related incidences, are detected without the need of parking meters neither watcher personnel, and transmitted automatically to a management centre, for processing and execution. This System includes all partial aspects indicated in the referenced previous Patents, and many other additional aspects still not covered, all of them integrated within an advanced new generation architecture, within a Machine to Machine context.

In this way they are achieved a set of economical advantages, due to the high cost of installation and maintenance of the existing parking meters and the very high cost of the personnel for the contracted enterprises, the social impact, due to the labour problems, potential strikes, and the enterprise responsibility for the service provision and user quality of service. By means of the present system it is provided an automatic service for the parking devices, authorizations, payments and infractions management and other services.

1.3 OBJECT OF THE INVENTION

The present Patent of Invention, Automatic Regulated Parking System, refers to the system, method and equipments for the control, management and administration of the regulated parking of vehicles in the public road, also applicable to private areas, proposing an automatic and integrated approach. It is based on the communication between network units using radiofrequency (RF) technology, and optionally physical cabling from the Access Node, and the use of RF User devices, being the basic user device and the simplest one a RFID card. It includes tracking of the parking devices state, identification of vehicles illegally parked, data processing of the belonging proprietary vehicles, and determination and execution of the actions on the owners of the vehicles, when the current rules and regulations are violated, all of those constitute the Basic System Services.

The Automatic Regulated Parking System 10 comprises: A set of User Devices 11 that communicate by means of Smart Network Terminals 12, a set of Smart Network Terminals 12 that communicate with a Network Control Centre 15 by means of an Access Node 13, a set of Network Access Nodes connected to Network Nodes 14, a set of Network Nodes connected to a Network Control Centre 15, a Network Control Centre 15, a User Management Centre 16 connected to the Network Control Centre 15 and a reduced set of Agent Mobile Terminals 17 for user management. The Network Node between the Access Node and the Network Control Centre may be saved for the coverage of reduced areas.

The user device 11 allows the user information and data communication to the user management centre 16, by RF access to the network through the smart network terminal 12. The Smart Network Terminal (SNT) 12 controls the location and identification of the user devices set 11 within its coverage area, the network Access Node 13 allows the communication of the smart network terminals, within its area, with the network control centre 15, this unit configures, handles and operates the set of SNTs 12 in the global System. The User Management Centre (UMC) 16 defines and manages the user profile, and it controls in real time the parking process and parking time, in order to perform charges belonging to the parking service and to apply the corrective actions in case of infraction of the established regulations.

Although the parking system 10 is fully automatic, in addition, by means of an Agent Mobile Terminal AMT 17, a user management agent of the Municipality has access to the user devices 11 to obtain user data, being in communication with the UMC 16, through the network node 13 and the network control centre 15.

Two types of RF user devices 11 are distinguished: The basic type, constituted by an RFID card, and the advanced user device 11 that is equipped with additional functions as screen, keyboard (even tactile) 1207-1208, GPS data, vehicle data interface 1206 and Multimedia communication, it may be installed in the vehicle or portable. The user device 11 is acquired by the users, being authorized by the Municipality, and having a profile according to the parking rights of the user. The users are responsible for the allocation of the device 11 on the front panel of the vehicle, in case of RFID card, and in any case accessible by radio, as well as for its activation and interaction for the parking operations.

Two types of services are distinguished: Basic Services, which are those indicated above, and the Supplementary Services which allow the management of additional functions for free spaces state, public information, provided by panels and fixed and mobile terminals, free space guiding, positioning, watching and tracking of authorized vehicles, and other services for persons and things, located within the Smart Network Terminals 12 coverage area, provided that they are carrying the user device 11, all those services are implemented using the information resources available in the System Data Base.

The system architecture 10 is scalable and the system dimension is configurable from the Network Control Centre 15 and the User Management Centre 16, according to the number of users to regulate, achieving, with the present architecture, a service range from hundred of vehicles up to ten million vehicles, and from some tenths of parking spaces up to one million of parking spaces.

1.4 DETAILED DESCRIPTION OF THE INVENTION

The present solution is based on the delivery of RF user devices 11, which are RFID cards, in its basic mode, and small equipments for advanced devices, without a limitation in the parking busy time, that is determined exactly when the parking space is released. There are different configurations of user devices 11 for resident users, authorized users, visiting users and other user types. The user devices 11, which are parking RFID cards in the basic mode and are allocated on the vehicle frontal part, contains all the user information, and communicates with the Smart Network Terminal 12, in normal operation, and with the management agent mobile terminal 17 for specific operations.

The parking meter posts are eliminated, with the corresponding reduction in the maintenance personnel, thief actions and fraud cases. The control functions and time counting, location determination, user devices validation, parking cost charging and other functions are realised automatically through the SNT 12, in communication with the user management centre 16, by means of the network control centre 15, without the need of coins, credit cards or another manual payment media.

All the information on the network configuration and status, including all elements, parking operations, user profiles, applicable rates and others are stored in the network control centre 15 and the user management centre 16.

All the regulations belonging to parking renewal, parking rates, parking areas classification, parking timetables and others are applied in automatic way, with the approval of the user management centre 16.

The present invention allows the Municipality to avoid: the big posts of the parking meters, with the big installation and maintenance costs, the controller wardens required for the parked vehicles, with the very high cost for the contracting enterprises and with the risk of personnel strikes, having a big impact on the quality of service, the moving of users to obtain the parking tickets, the use of coin payment, and to allow: the application of the exact parking time, to receive detailed information about all parking operations, to provide specific image and video information on authorized operations and to develop Supplementary Services, on the same System architecture.

The Smart Network Terminal 12 realises the communication functions with the RF user devices 11 and, through the corresponding network access, communicates with the network control centre 15 in order to support all the network system functions, including at least the following:

In relation with the user devices 11 it performs at least:

a. Periodic scanning of its area devices, solving the coverage overlapping with other smart network terminals 12. The access node 13 and the network node 14 are transparent for the user management information.

b. Vehicle identification by means of the plate number.

c. Profile and rights verification for the vehicle owner, at the network access level d. Parking device validation and e. Data transmission and reception with the network control centre 15 and the user management centre 16.

With respect to the vehicle identification, within its parking area, there are at least two cases: the Normal case, when the RF user device 11 is correct, in which case it receives the complete information from the user device 11, performing a normal data processing, and the Abnormal case, due to lack of user RF device 11, no activation, no updating, fraud, false release, forbidden area and others, in which cases the smart network terminal 12 identifies the vehicle that has been parked, by means of its plate number, sending through the network control centre 15 the obtained information, in order the user management centre 16 to take the corresponding actions. The user management centre 16 may send a control agent, if necessary, in order to verify the infraction and to take in short time immediate actions, the user management centre 16 performs a notification identifying the vehicle.

The Smart Network Terminal 12 is allocated at a place from which it is possible to perform the RF communication functions, the identification of the parking spaces, the vehicles location and the vehicles identification. That place may be a public lamppost, another type of public post, as a traffic light, or a public street building front.

With the initiation and end parking data the user management centre 16 proceeds to the corresponding charging and invoicing, including all details required by the payment media chosen by the vehicle owner (bank account, personal or another media).

The Network Control Centre 15 performs, in automatic way, all the control, maintenance and operation functions of the system, at the network level, having its architecture been configured with the adequate level of redundancy to assure the quality and service reliability performances. Given the high complexity of such a centre, they are differentiated the real time process functions and the management functions, that belong to the non-real time processes, but having a close coordination between both. To support the maintenance functions, a network control centre operator has access by RF to the user devices 11, and to the smart network terminals 12, in order to perform some configuration data monitoring and verification, identification and operation status control, in direct communication with the Network Control Centre (NCC) 15.

By means of the present System, only a minimum number of personnel are needed, either in the NCC 15 as well as in the public road for maintenance tasks, monitoring and equipment failure detection, within the coverage area.

The NCC 15 has the control and storage media to handle the full set of smart network terminals 12, access nodes 13 and network nodes 14, in order to support up to ten million vehicles and more than one million of parking spaces.

The User Management Centre (UMC) 16 has the processing and storage media to manage a set of users up to the dimension above indicated, including all vehicles owner information as well as all parking spaces specified by the Municipality. A minimum number of user management agents are required for specific corrective action cases, or authorized watching and tracking activities.

In addition, the present System allows the Supplementary Services related to free spaces management, public information, provided by panels and fixed and mobile terminals, free space guiding, positioning, watching and tracking of authorized vehicles, and other services for persons and things, located within the SNT 12 coverage area, provided that they are carrying the user device 11, all those services are implemented using the information resources available in the System Data Base. On the other hand, it is possible to support an interactive Multimedia Communication between the UMC 16 and the interested Users, which are carrying the Advanced User Device 11.

The Network part implementation may be performed either by means of:

a. A Private network, incorporating the System Units described as Access Nodes 13 and Network Nodes 14.

b. The Mobile Public Network, on the basis of SMS messages, or another new generation media, with the Smart Network Terminal 12 accessing to the Base Station, as an Access Node 13.

c. By the Internet Network, with the SNT 12 accessing to a WLAN, e.g. WiFi

1.5 IMPLEMENTATION EXAMPLE

In FIG. 2 it is shown a five levels system architecture, for the case of big areas, but the present concept of invention, designed in the context of a Machine to Machine architecture (M2M), may be reduced to four levels in case of lower coverage areas, by cancelling the Network Node 14 (FIG. 3), since the information communication with the Network Control Centre 15 and User Management Centre 16 is transparent through it.

The preferred implementation, based on the specified multilevel architecture design, is that of Private Network System, on the basis of proprietary Communications Equipments, however the proposed multilevel architecture may be implemented by means of the Mobile Cellular Network Infrastructure, by access through the Base Station, or using the Internet Infrastructure with access through a WLAN station, e.g. WiFi.

The Basic regulation will be usually unique, for a given Municipality, in such a way that it will be possible to use the RF user devices 11 anywhere within the Municipal area, however the system flexibility allows the application of different requirements.

It is possible to configure the user information, as well as the network control centre and user management centre 16, such that the same user can utilize his device in different municipalities, provided that they use the system proposed in the present invention.

The basic User Device 11 has the characteristics of an active RFID device, including a control element adapted and configured for the communication with the smart network terminal 12, according to the messages, states and timers defined in the present invention, it is therefore a bidirectional device, interactive and integrated in the system access network The advanced User Device 11, as shown in FIG. 12, it is associated and integrated in the vehicle by means of its Data Interface 1206, allowing the interaction with the vehicle and driver operative, in the context of a Machine to Machine system, as required for an advanced automatic parking service. This includes from the basic parking functions up to monitoring and state, operation and security information of the vehicle and driver, both during the parking phase as well as during all the parked time. It has at least the following functional blocks:

User Device transceiver 1204, it realises the radiofrequency link with the Smart Network Terminal (SNT) 12, within the allowed frequency band for the public parking, or private parking.

Modem 1205, for the signals modulation and demodulation of the sent and received digital information to/from the SNT 12, on its configuration, identification, profile and state, as well as the corresponding to the additional services of location, vehicle data and user interactive communication.

Multimedia Processor 1203, it performs the control and communication functions of the User Device 11, and it allows the device data and programmes updating from the network.

User Memory 1201, it stores the data and programmes for control and operation. Integrated GPS Detector 1202, it generates and facilitates the vehicle location data, in order to be sent to the SNT 12 and UMC 16.

Vehicle Data Interface 1206, it collects the vehicle state, operation and maintenance data, including the driver state, being provided by the specific vehicle devices. The Vehicle Data Interface 1206 allows the interaction of the System Units with the User Device, according to the state, operation, maintenance, vehicle and driver security data, in a context of smart and connected vehicle.

Screen 1207, it presents the management information, optionally with multimedia performance.

Optical Minicamera 1209, for transmission of image and video on the different user informations.

Keyboard 1208 and audio, even tactile, it allows the interactive access of the User to the UMC 16 and AMT 17.

The Vehicle Data Interface 1206, Optical Minicamera 1209, Screen 1208 and Multimedia Processor 1203, allow the user audio, video or data communication, and also the Integrated Multimedia Communication, in order to provide the System Supplementary Services.

The Network System Architecture to implement comprises:

1. The Smart Network terminal (SNT) 12, as shown in FIG. 1, is allocated in an adequate place for the vehicles detection. When a driver is parking his vehicle, he must foresee that the RF user device 11 is activated and operative, and in the case of RFID card, this shall be placed on the front part of the vehicle on a visible place, behind the windglass.

The main SNT 12 performances are the following:

a. The SNT 12 is installed in a public or private road place that allows the transmission and reception with the RF user devices 11, within its vehicles detection area, and the visualization of the vehicles plate numbers, in the parking places, during the parking phase. The SNT 12 is typically allocated in a public lamppost, in such a way that there is a direct sight of the plate number for the parked vehicles, although other allocations as traffic light post or building front may be also adequate.

b. The SNT 12 communicates with a set of user devices 11, located on the vehicle frontal part, in case of RFID card, verifying by means of periodic interrogation the RF device validity, if the device is not valid it will be reported to the User Management Centre (UMC) 16 in order to take adequate actions.

c. In case of any incidence, due to lack of RF user device 11, device not active, device malfunctioning and others, the SNT 12 identifies, through radiofrequency radiation or optical radiation, GPS (optionally only), optical camera and other detection and processing media, the parked vehicle, reporting to the User Management Centre 16, through the Network Control Centre (NCC) 15, about the vehicle plate number, in order to make the adequate search and take the corresponding actions, it may be the case of the vehicle user device 11*c* within FIG. 1.

d. The SNT 12 sends the plate number directly, once been processed, to the UMC 16, through the NCC 15.

e. The SNT 12 can send the plate number identification to the UMC, and, under UMC or NCC request, it can send fixed image or video information, on an authorized specific operation, that is realised for a parking area and a determinate vehicle.

f. The SNT 12 incorporates a scanning and monitoring programme for the user devices 11, being under its coverage area, in such a way that when a parking space is taken by a new vehicle, it detects its presence and proceeds to the identification. The SNT 12 initiates a process of identification and validation, the identification Normal Mode is carried out by the RF communication with the user device 11, if that is not possible, due to device unavailability or incorrect operation, the SNT 12 realises the identification by means of the plate number detection, initiating the infraction process. Even in the case of being possible the RF user communication, the infraction process will be also started if the device data are not corresponding with the applicable regulations. All that information will be received in the UMC 16 to take the adequate actions.

g. The SNT has RF communications media, a radio detection equipment (e.g. Radar) or alternatively an optical radiation equipment (e.g. Laser) 808, to identify the busy parking spaces, a user GPS data processor (as optional location information support) and an Optical camera 809 to obtain general image information, and in particular the plate number information, within its coverage area. The various elements will operate in coordination, under the Digital Multiprocessor 803 control, in order to identify the illegally parked vehicles and to transmit the corresponding information through the NCC 15 to the UMC 16.

h. The SNT 12, as shown in FIG. 8, has an architecture that comprises at least:

An RF user transceiver 801 to realise the RF link for the user device 11 communications, working in the allowed frequency band for the public/private road parking applications.

A modulator/codec 802 and a demodulator/decoder 806 for sending the digital information signals to the user device 11 and receiving on its identification, profile and status.

A network transceiver 805 to realise the RF link with the access node 13, in the frequency band allowed for the public/private road parking.

A network modulator 807 for modulation and coding of the information generated and integrated by the SNT.

A network demodulator 804 for the demodulation and decoding of information received from the NCC 15, related to the own SNT 15 and to the users set, within its coverage area.

A radio detector or optical detector 808, with optional user GPS data support, that is a detection functional block based on radiofrequency (e.g. Radar) or optical radiation (e.g. Laser), as a part of the SNT 12, for the detection of parking spaces state, operating in coordination with the RF user identification and the visual identification Optical camera 809.

An optical camera 809 for getting the vehicles image and video information during the parking operation phase, parking space stay and parking space release.

A video interface 810 which allows to adapt, to manage and to select the detection media information, and sending the data and image information to the High Performances Digital Multiprocessor 803 and the fixed image information or video to the network modulator 807, in order to be received by the NCC 15 and the UMC 16. This interface allows to send selected and authorised information, on the parking operation, the parking environment, vehicle state, driver state and other information, to the Network Control Centre 15 and the User Management Centre 16, in real time or delayed, when it is required, and on Smart Network Terminal 12 identified specific events.

A High Performances Digital Multiprocessor 803, as shown in FIG. 9, that realises the processing, coding and framing of the data handled by the SNT 12, related to the set of users and user devices within its coverage area, and also on the own equipment, to support identification, validation, configuration and monitoring functions, as well as other network functions. It performs, on the set of users, the detection and validation of the parking spaces, plate number identification, image and video signal handling, to be sent to the NCC 15 and UMC 16, as well as the monitoring information that is generated by the own SNT 12 and all elements, within its coverage area.

The High Performances feature refers to the advanced functionality required for the coordinated and integrated control, of the parking operation, on the basis of the location media provided by the RF or the optical radiation detector 808, in order to detect a released or busy space, with the support of the optical camera 809, in order to get a higher accuracy, and optionally the GPS data provided by User Device, and to get the plate number by means of the optical camera 809.

The parking operation control, as well as the signal and image processing on the parking space busy and release, obtained by the radio or optical detector 808 and the optical camera 809, is realised by the Digital Multiprocessor 803, that, using the adequate signal and image analysis algorithms, allows the vehicle identification, when an incorrect parking has been produced, sending such information, in real time or delayed, to the UMC 16. On the other hand, it controls the state of the parked vehicle during its parking phase, to detect if any abnormal event happens.

The detection media, RF or optical radiation detector 808, the optical camera 809 and the optional GPS data, are used in a combined way, to determine the space parking busy state and the related parking zone, either in case of Normal parking as well in case of Abnormal parking, since a priori it is not known how the parking will be carry out.

The only optical camera 809 is able the determine the busy state of a parking space, however, the RF or the optical radiation detector 808 are used for cases when the parking processing is less complex, reducing the optical camera tasks and the processing load associated to the Digital Multiprocessor 803.

The High Performances Digital Multiprocessor 803, of low cost and power consumption, is functionally constituted by:

a). A Hardware part, with Multiprocessor architecture, that consists of 4 Processors for the User Access 905, Location 906, Network Communication 907 and Generic functions 908, with their related private memories 901-904, private busses, common busses 909 and user, detection and network communication interfaces 911-913.

b). A Software part, that consists of the operating system, able to manage the elements of the hardware architecture, and the applications part, in correspondence with the functions of: RF Access Control, Image, Video and Location (including capture, processing, analysis and data transfer), the Communication with the Network and the Generic functions of configuration, maintenance, operation and updating of the own software.

By means of the equipment architecture above described, the plate number information is obtained in the SNT 12, for its transmission, once it has been locally processed, to the UMC 16.

It is possible to realise the remote programming and configuration of the SNT 12, on the basis of the incorporated High Performance Digital Multiprocessor 803.

Timing generator and Synchronizer 811, it is a functional block to generate the digital control timing and the parking use counting, performing the synchronization of all SNT elements and the synchronization of the own SNT 12 with the NCC 16, within the SNTs 12 global network and the system access nodes 13.

Power supply subsystem 812, to obtain and to manage the power supply of the SNT 12 functional blocks, based on the combination of public network electrical energy and photovoltaic energy.

2. The Access Node (AN) 13, it allows the transparent communication of the SNTs 12, belonging to its area, with the NCC 15 and UMC 16, the preferred implementation is a private access node, but it may be public mobile access node or an Internet WiFi access.

3. The Network Node (NN) 14, it allows the transparent communication of the access nodes 13 with the NCC 16, within its coverage area, performing the routing and multiplexing of the signals received from the access nodes 13.

4. The Network Control Centre (NCC) 15, as shown in FIG. 10, is a fundamental part of the Communication Network, within the Machine to Machine architecture that is required by the integrated system, and controlling the real time functions of the Network Service Layer. It has an architecture that comprises at least the following functional blocks, all of them specific for the communication with the SNTs defined in the present patent:

Initialization and Synchronization 1002, it realises the start of the own NCC and it controls the start of the depending network units (smart network terminals 12, access nodes 13 and network nodes 14), when they are incorporated to the present network.

Connections Control 1005, it manages the depending network units connections, on the basis of a routing map for its proper execution, and it realises the traffic management, and the assignment of bandwidth and transmission speed for each communication channel.

Operation 1008, it realises the automatic functions related to the parking operation, according to the defined communication scenarios between units, and it allows the states presentation and the access of the operators to the network system, by means of the operation consoles.

It is possible to realise the data and programmes updating and the remote configuration of the user devices and the SNTs 12, on the basis of the High Performances Digital Multiprocessor 803 incorporated in the SNTs 12.

It realises the data updating in the Access Nodes 13 and Network Nodes 14.

It also realises the network Configuration, according to a Management Information Base (MIB).

Maintenance, Redundancy and Security 1003, it realises the monitoring and reconfiguration in case of failure, of the Network Units, in a centralized way, to achieve the reliability performances and the Network System Security requirements. A network control centre operator has RF access to the user devices and the SNTs 12, in order to monitor and verify the configuration, identification and operation state data, in communication with the NCC 15.

Data Base 1007, it is a general data base for the registration of all the network elements, for the state control of all elements, the configuration management, the failure state, performances achievement, security level and to obtain traffic statistics, in order to get the best network resources assignment.

Network Nodes/Access Nodes Interface 1006, it manages the connection, for the various network stack levels, with the Network Nodes 14, or the Access Nodes 13 in case of reduced configuration.

User Management Centre Interface 1001, it manages the connection, for the various network stack levels, with the User Management Centre 16.

The Functional Blocks Modular Architecture allows to scale the Network Control Centre 15 up to its maximum dimension.

The presented architecture allows determining easily the number of Racks for the equipments support, according to the network dimension, the number of users, the number of parked vehicles and the number of parking spaces.

In addition, the present architecture allows a flexible assignment of the number of parking spaces per SNT 12, the number of SNTs per Access Node 13, the number of Access Nodes 13 per Network Node 14 and the number of Network nodes 13 per NCC 15, achieving a service capability above ten million vehicles and above one million parking spaces.

5. The User Management Centre (UMC) 16, it is a fundamental part for the real time control and the user services, at global system level, and for the support of the system Supplementary Services, within an integrated Machine to Machine architecture. It has an architecture that comprises at least the following functional Blocks, all of them specific for the communication with the User Devices 11 by means of the Smart Network Terminals 12, defined in the present patent:

User registration 1101, it allows to determine the user types and the corresponding profiles.

Identification and Service Control 1102, it realises the identification and service related functions for users and vehicles, according to the communication scenarios.

Corrective actions 1103, it determines, communicates and manages the adequate actions in case of infraction.

Agents Management 1104, it supports the User Management Agents 17 communication for specific and authorized actions.

Reports edition 1105, it comprises the information functions related to the parking Service Users.

Data Base 1106, it is a general data base for the registration of all elements that are going to be managed (profiles, configurations, performances, security and others), it allows to obtain space occupation statistics, within a parking zone, and to support the set of Supplementary Services defined in this patent.

Regulation 1107, it comprises the storage, management and communication of all regulations applicable to the parking Management.

In FIG. 11 are shown the Functional Blocks of its architecture.

6. Agent Mobile Terminal (AMT) 17, it is an specific mobile device for the proposed system, different from a cellular mobile terminal, that interacts with the basic user device (RFID) 11 and with the advanced user device 11, and it allows the communication of the Management Agent with the User Device 11 and User Management Centre 16, for the management of specific applications, at the same time that the Smart Network Terminal 12. It incorporates audio, video and data services in multimedia configuration.

Supplementary Services

In addition to the Basic Services, these are parking operation services, they are implemented a set of Supplementary Services, one type of these are parking related services, available 24 Hours a day, that at least includes: Free Space Management, Space Public Information, in panels and in fixed and mobile (personal/on board) terminals, Free Spaces guidance, Location, Watching and Tracking of authorized vehicles, and another type of services are not associated to vehicles, as the Communication, Watching and Tracking of authorized Persons and Things, within the SNT 12 coverage area, provided that they are carrying the User Device 11. All the above services are implemented by the User Management Centre 16 using the information resources available in the System Data Bases.

Due to the System functional flexibility that has been described, they can be incorporated new features and services, according to some additional requirements that may be specified.

1.6 DESCRIPTION OF THE DRAWINGS

The functionality, performances and advantages of the present invention are illustrated in the following Figures:

FIG. 1 shows the Automatic Regulated Parking System, in the Public Street of a generic Municipality, including the Units types that compose the System: User Device 11, Smart Network Terminal 12, Access Node 13, Network Node 14, Network Control Centre 15, User Management Centre 16 and Agent Mobile Terminal 17 for Users Management.

The vehicle user has an updated RF device 11, that is allocated on the vehicle frontal part, at a visible place, in case of being a RF Card. The user device 11 is activated by the user and it starts to transmit/receive when the user realises it activation, before leaving the vehicle, in any case.

Figure 1:
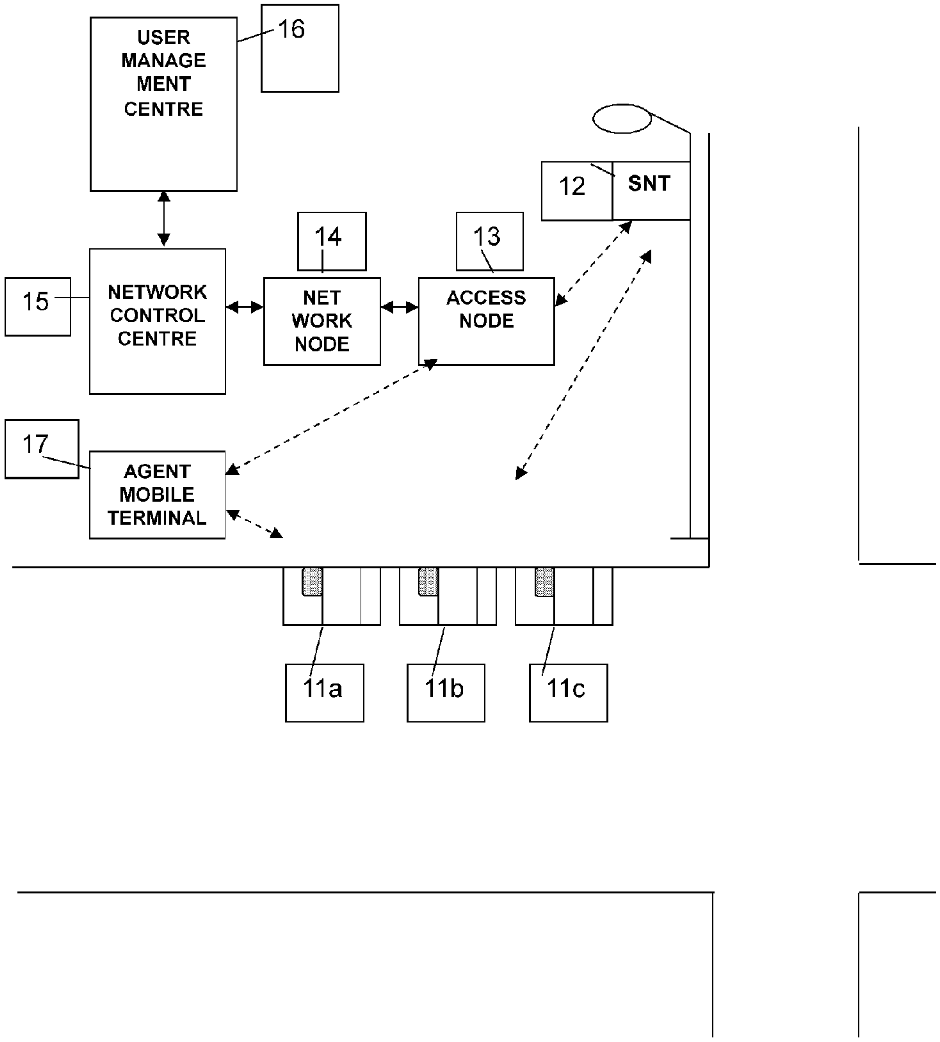
Figure 2:
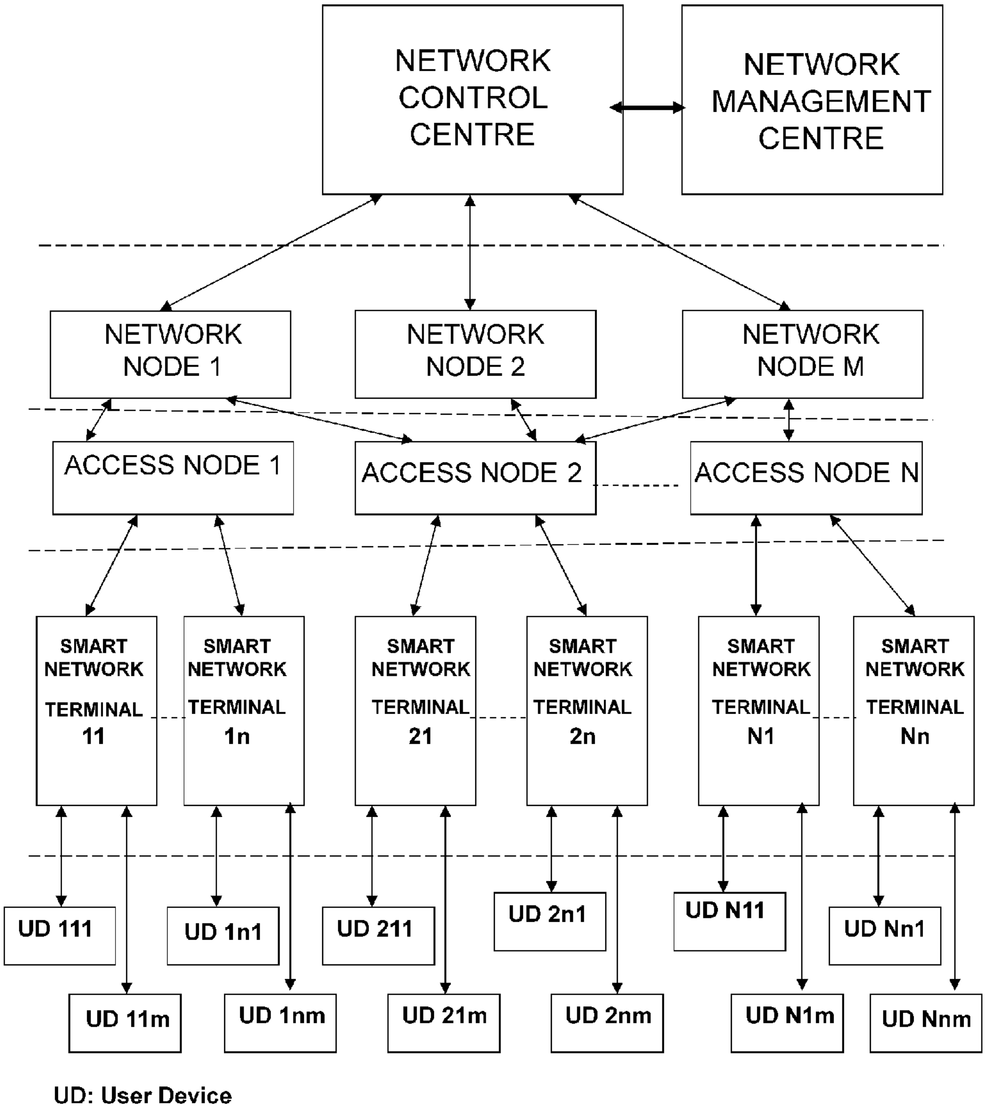
FIG. 2 shows the architecture of the system communication network, in 5 levels configuration, for the case of big parking areas.
Figure 3:
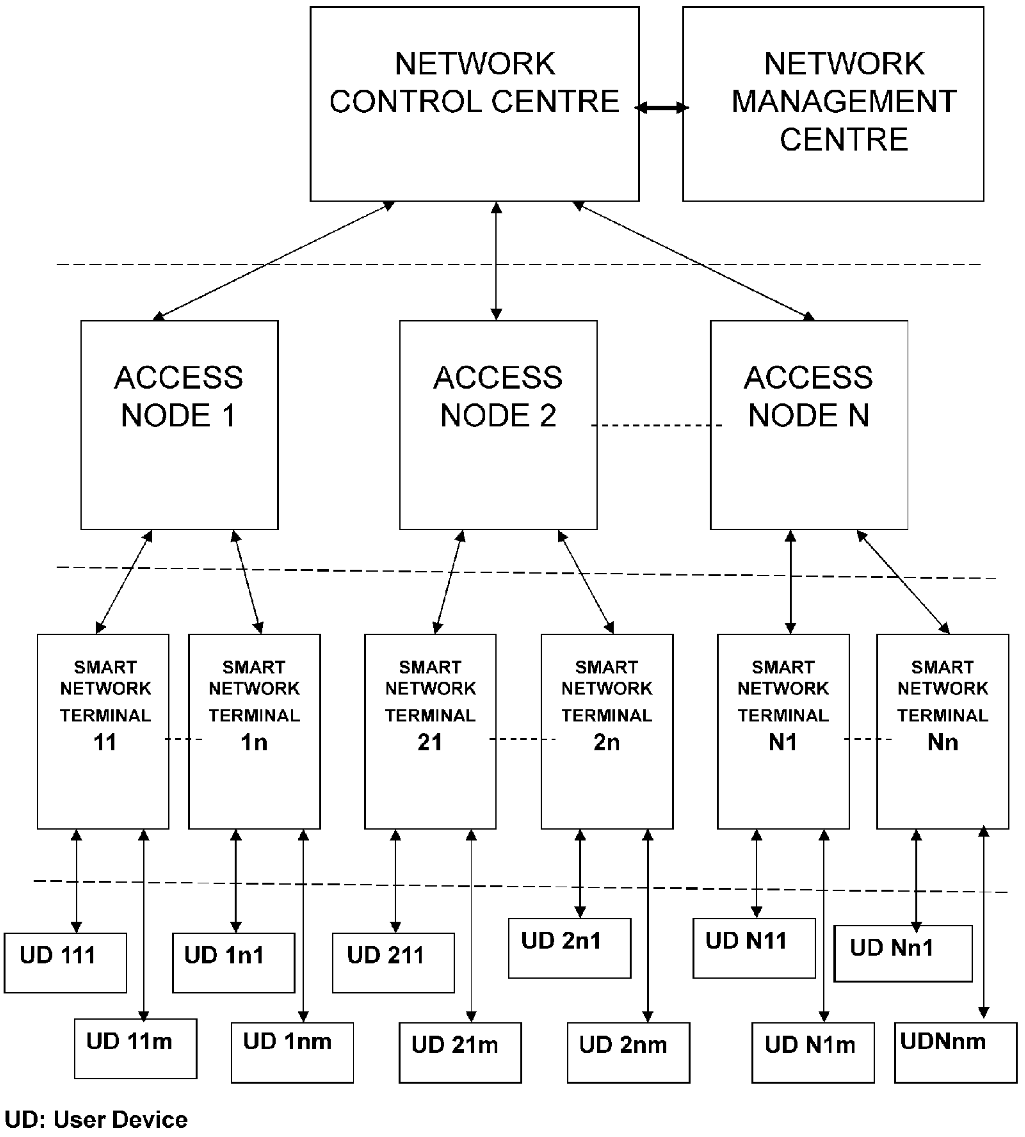
FIG. 3 shows the architecture of the system communication network, in 4 levels configuration, for the case of reduced parking areas.
Figure 4:
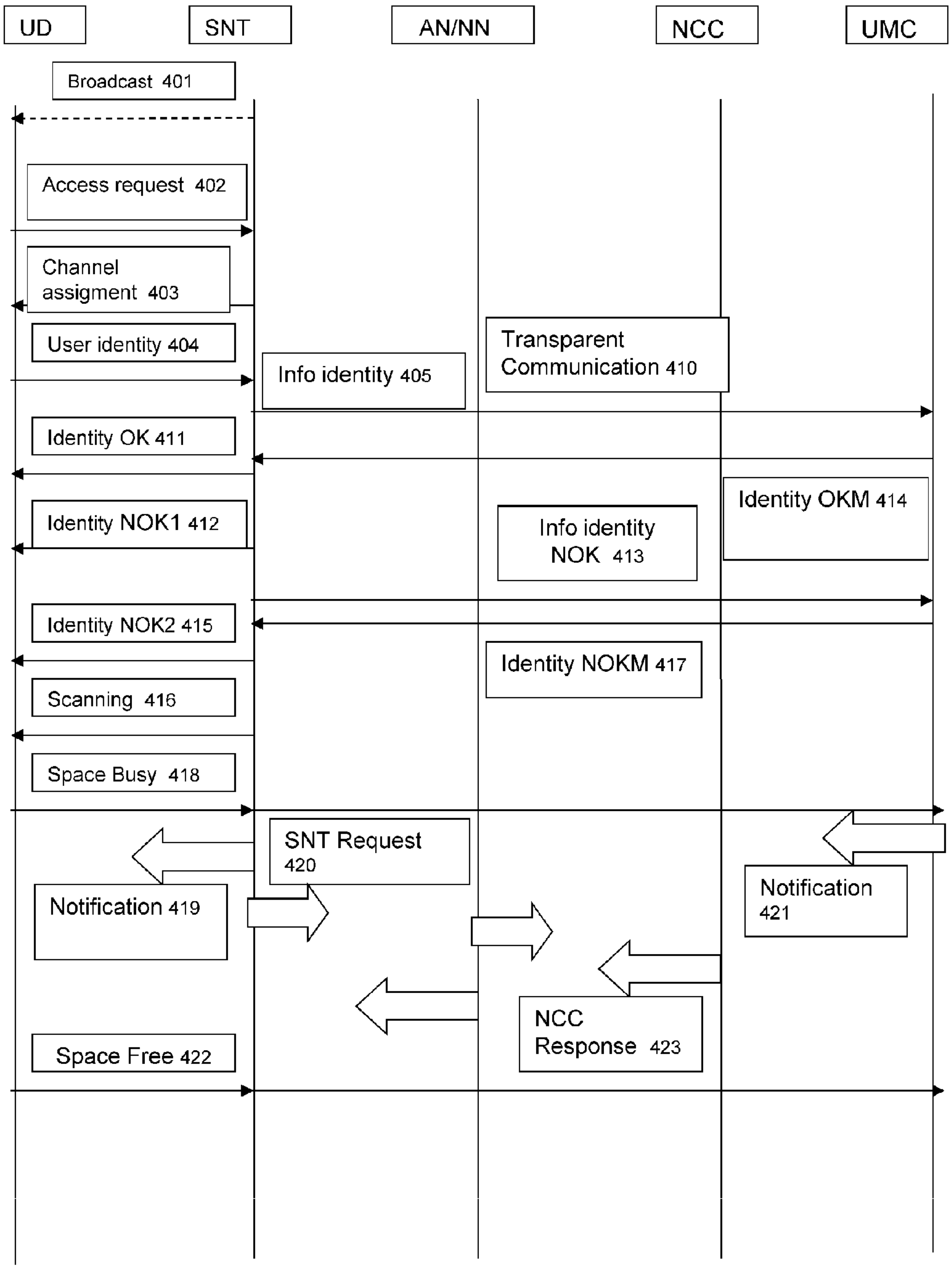
Figure 5:
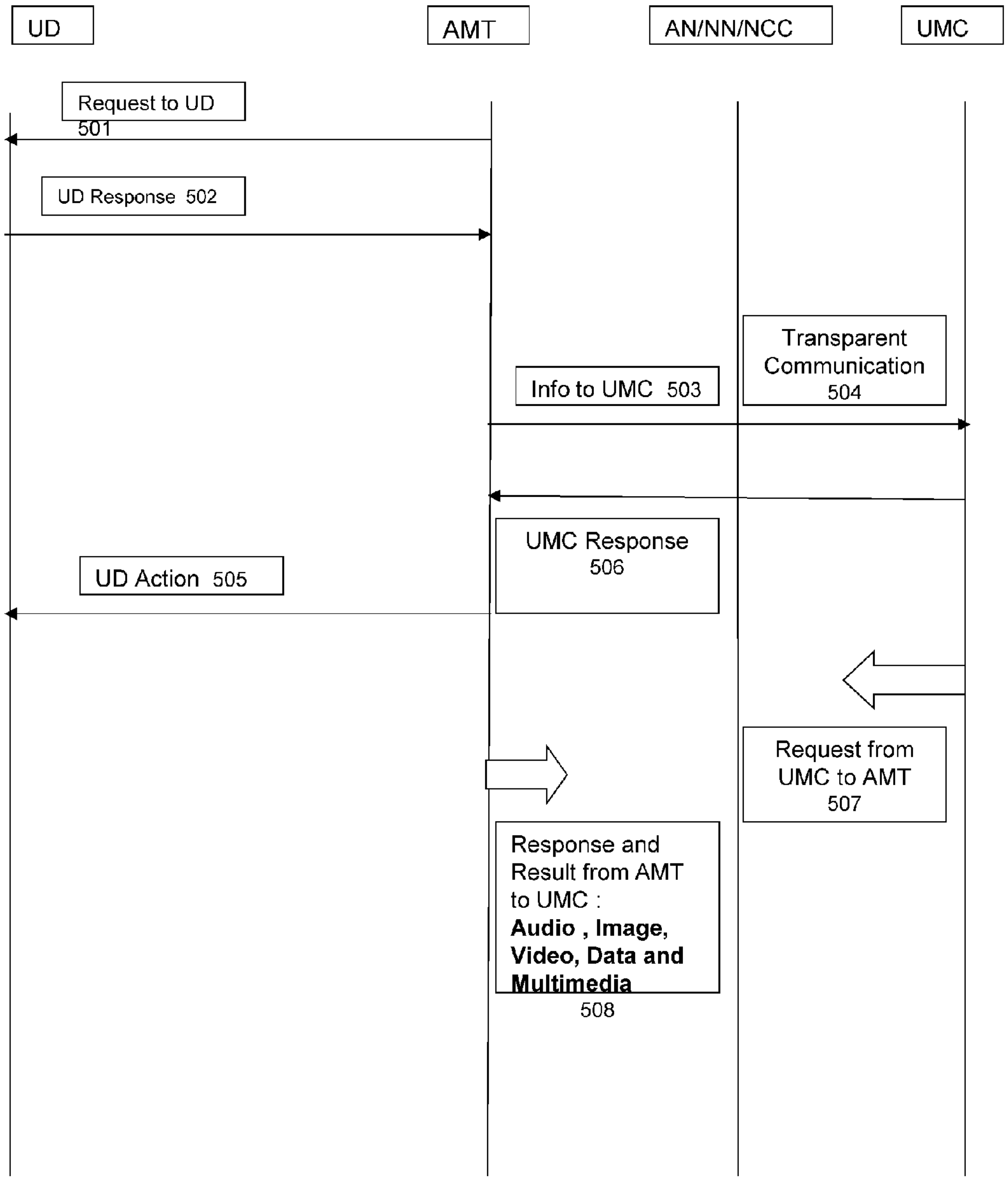

FIG. 4 shows the Communication Scenario between the Units that constitute the System, on the basis of the multifunction messages interchanged among units, for such purpose the messages have different fields in order to code each related functions. The Normal parking process starts when a driver parks the vehicle within the regulated public parking zone, activating the updated RF device 11, and placing the RF card on the vehicle frontal panel, if that is the case. This scenario shows how the SNT 12 communicates with the RF device to interrogate on the identification data, to proceed to identification and to realise its validation, in Normal case, in order to be reported to the UMC 16, trough the NCC 15, if the identification is valid or not. The basic identification tasks are the following:

a. User access request to parking
b. Parking User identification
c. Busy space parking detection
d. Free space parking detection FIG. 5 shows the Communication Scenario of the Agent Mobile Terminal (AMT) 17 with the UMC 16, for specific authorized local actions. That includes, among others, the communication of an AMT 17 with the UMC 16, due to a vehicle without RF device, either not active device or not valid device, to perform an authorized verification action, in interaction with the User Device 11.

Figure 6A:
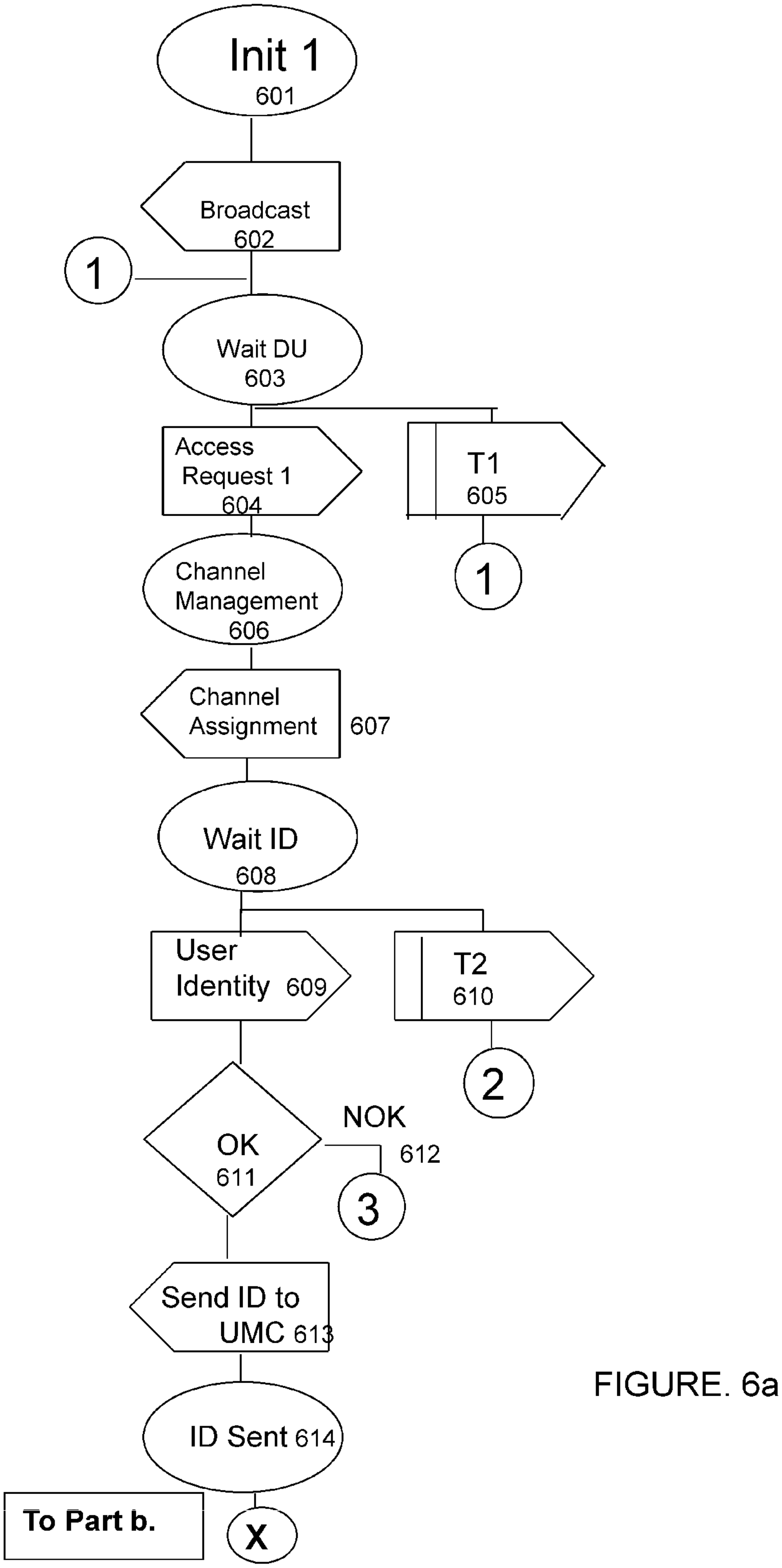
Figure 6B:
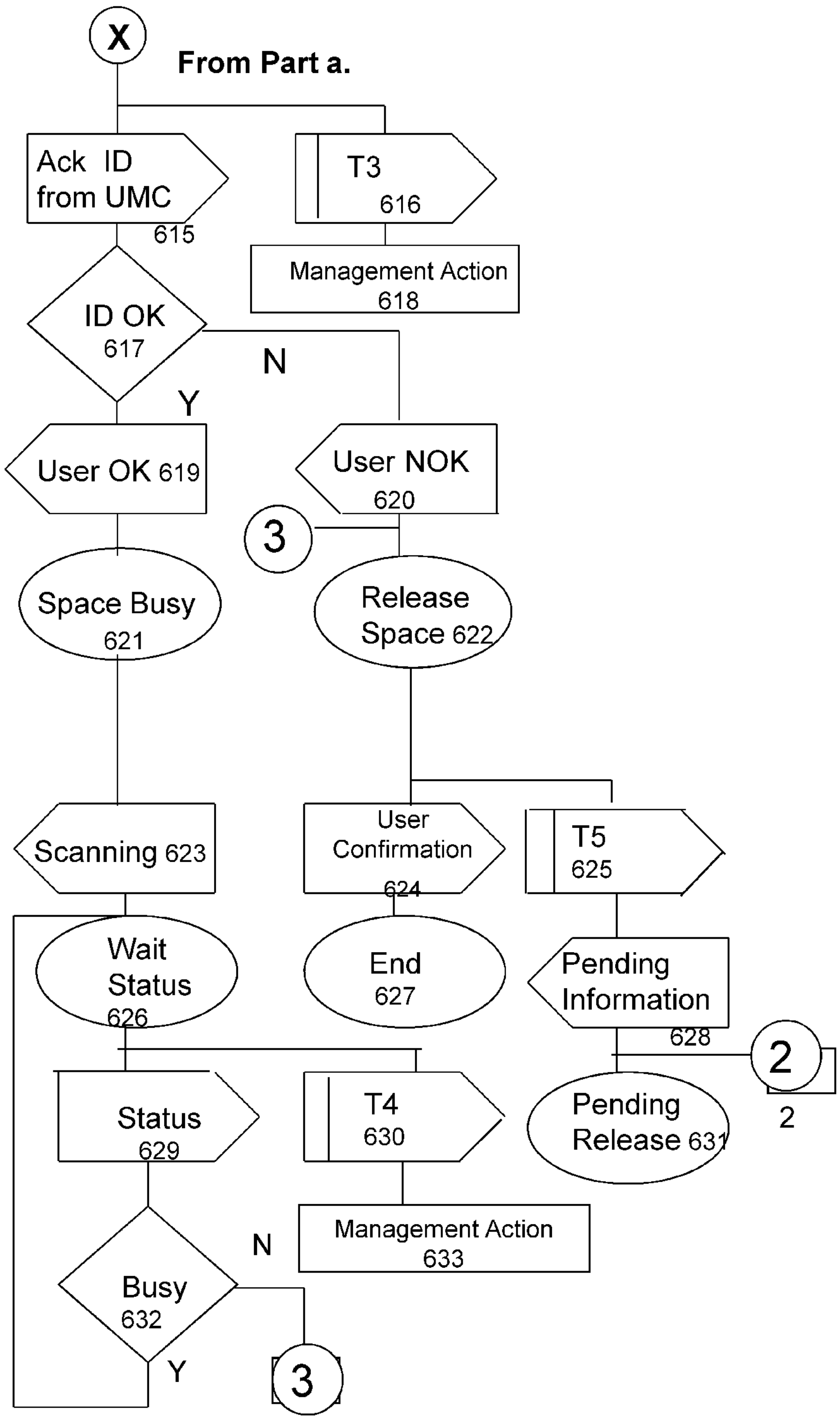

FIG. 6*a*. and FIG. 6*b*. show the basic states diagram for the user management, taking the SNT 12 as reference point. They show the various SNT 12 states, the input and output messages, for each state, the applicable timers and the associated actions, for each case.

Figure 7:
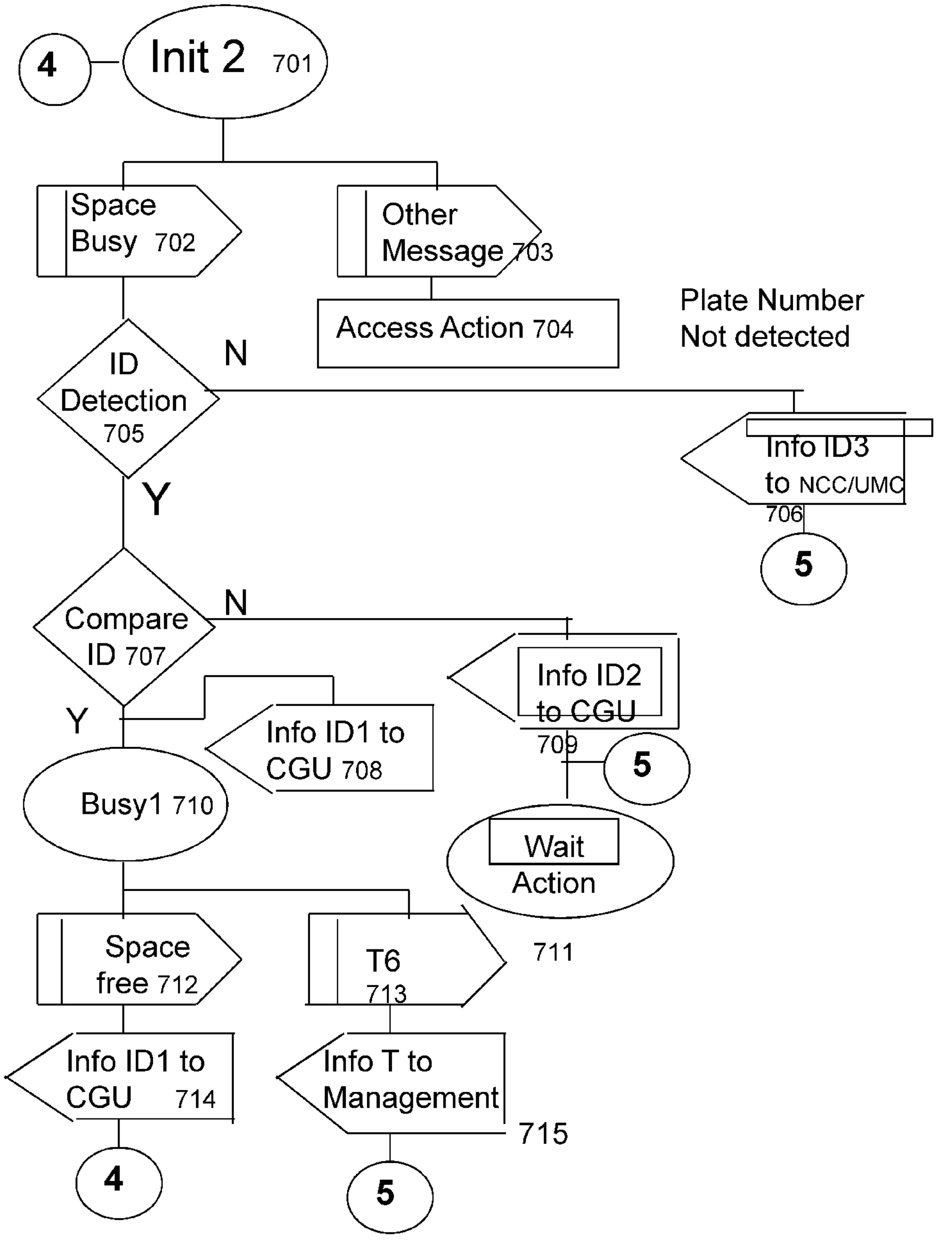

FIG. 7 shows the location states diagram for the user management, in case of Abnormal identification, taking the SNT 12 as reference point. In addition they are included the internal SNT messages related to the occupation detection and release of spaces, which are generated by the SNT 12 detection and identification media.

Figure 8:
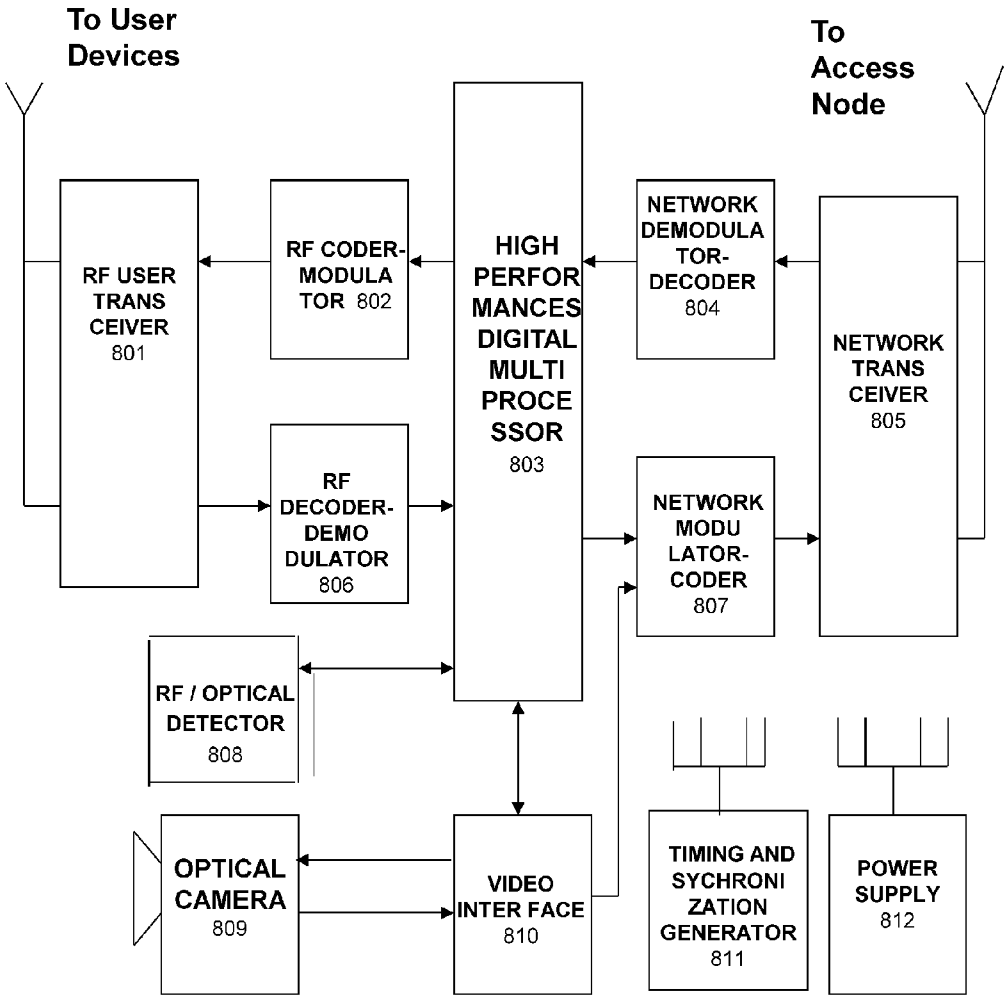

FIG. 8 shows the Smart Network Terminal 12 architecture, detailing its functional blocks and interfaces.

Figure 9:
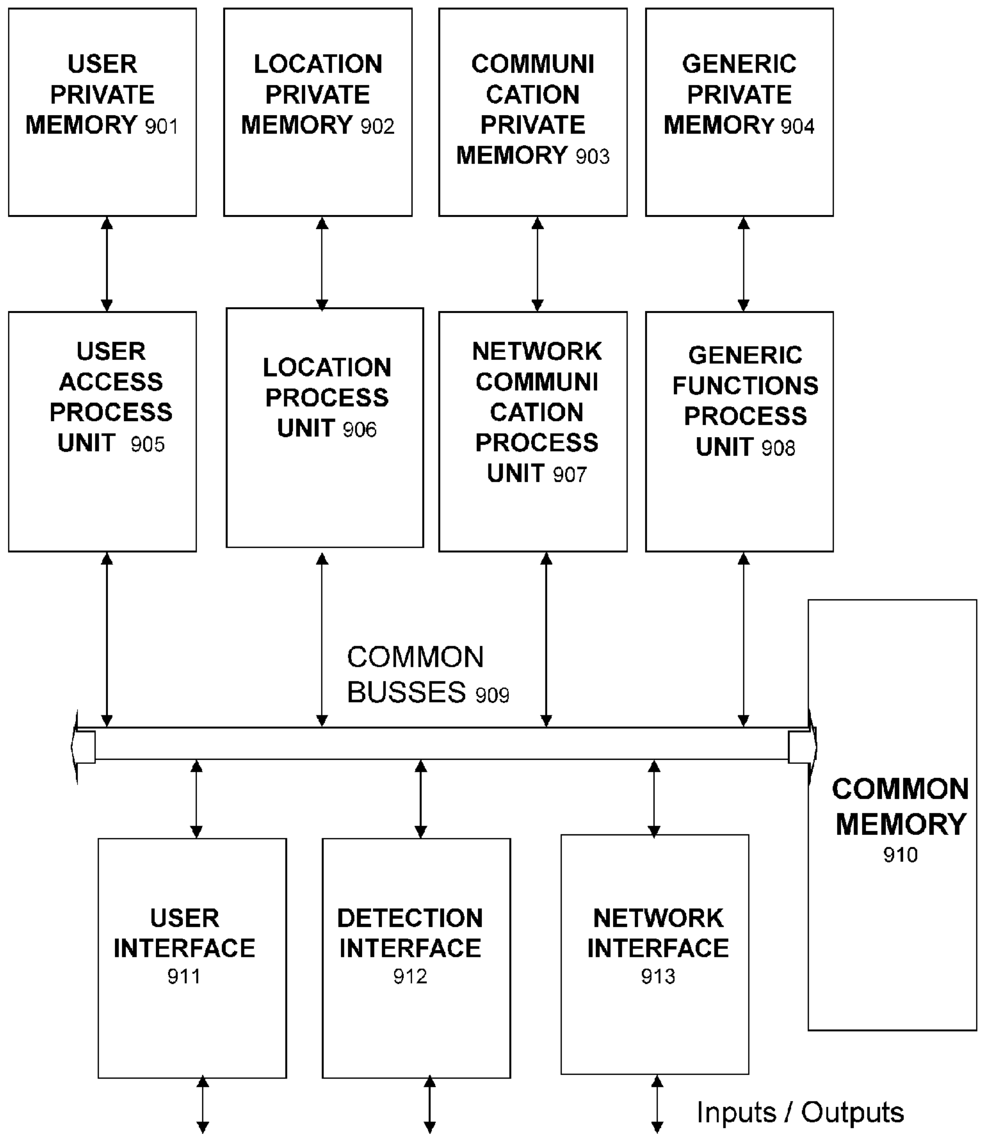

FIG. 9 shows the High Performances Digital Processor 803 architecture, detailing its functional blocks and interfaces.

Figure 10:
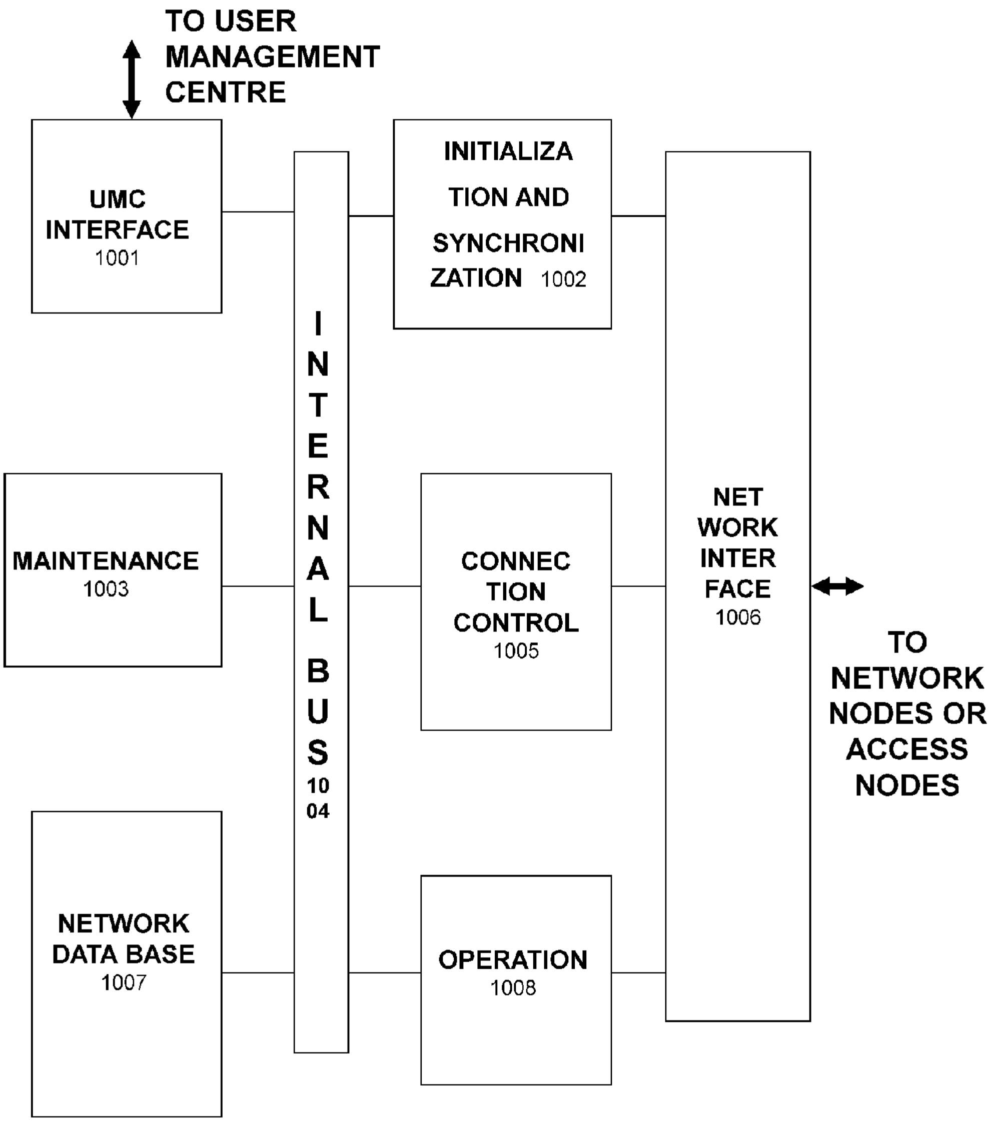

FIG. 10 shows the Network Control Centre 15 architecture, detailing its functional blocks and interfaces.

Figure 11:
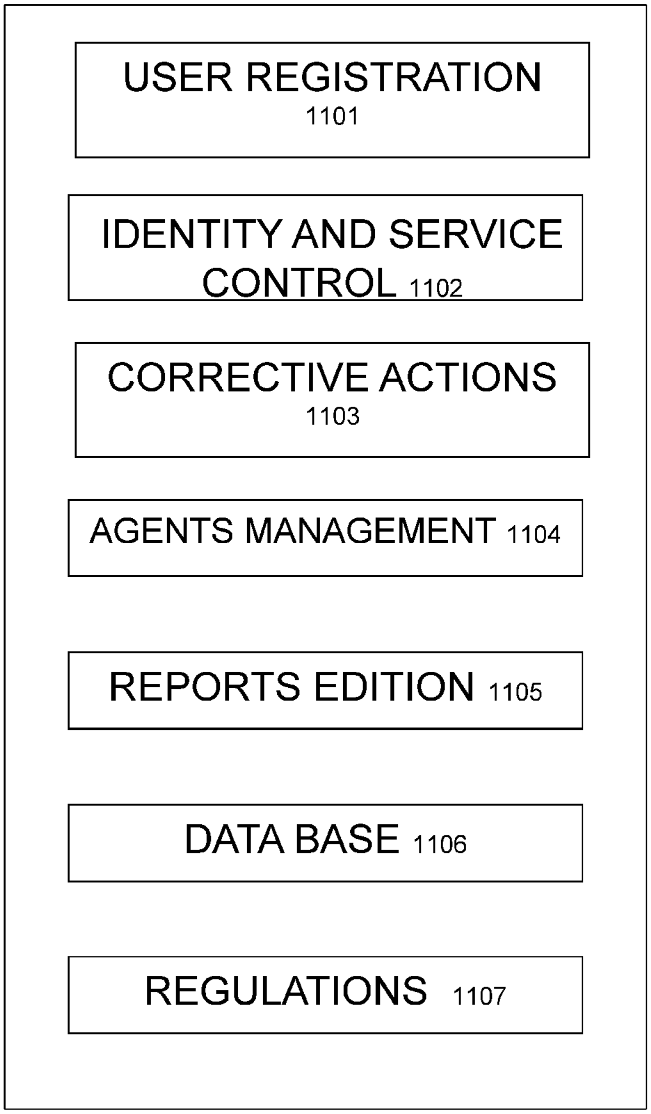

FIG. 11 shows the User Management Centre 16 architecture, detailing its functional blocks.

Figure 12:
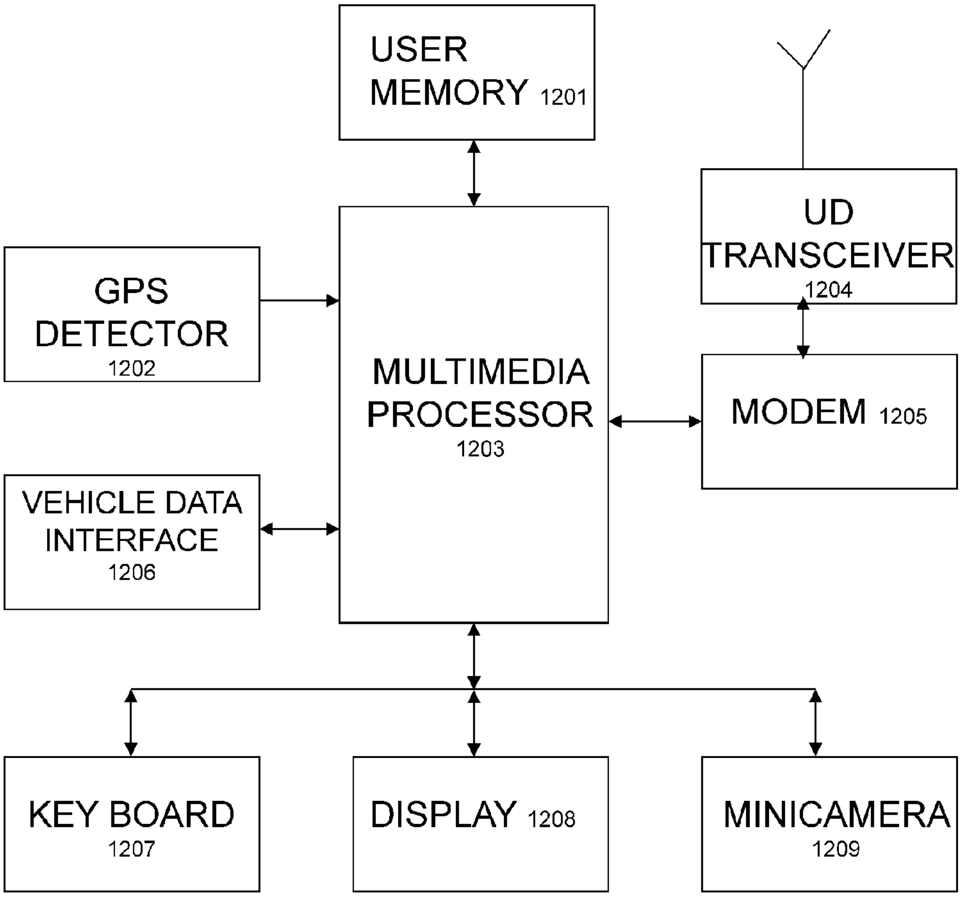

FIG. 12 shows the Advanced User Device 11 architecture, detailing its functional blocks and interfaces.

1.7 INDUSTRIAL APPLICATION

The Industrial Application of the present invention derives, in evident way, from the nature of the own invention and the performed description of the System Definition, with its different Units, the Communication Network Architecture in its different levels, the System Units Description and the component Functional Blocks, as well as the functionalities and performances of each System Units, including the High Performances Digital Multiprocessor 803 description, as a fundamental part of the Unit named Smart Network Terminal 12.

The invention claimed is:

1. A System for Automatic Regulated Parking in integrated manner, without parking meters neither parking wardens and without intervening a vehicle driver, on public and private roads, with non-delineated parking spaces, comprising:

A set of User Device units, that, in a basic embodiment they are called basic user devices and they are an RFID Card, with bidirectional and interactive performances, and in an advanced embodiment they are called advanced user devices and they are a small RF equipment, either installed in the vehicle or a portable one;

a User Device unit, for parking services, is associated with the vehicle, and functionally integrated in the vehicle, A set of Smart Network Terminal units, that communicate by RF with the set of User Device units for their control, management and updating, within the set of Smart Network Terminal units coverage area, A reduced set of Agent Mobile Terminal units, for a specific and authorized users management, which is a specific mobile device for the proposed system, interacting with the set of user device units, A set of Access Node units, that allow a transparent communication from the set of Smart Network Terminals units, A set of Network Node units, that allow a transparent communication from the set of Access Node units, the set of Network Node units is included or not according to the number of user device units, A Network Control Centre unit, that communicates with the set of Smart Network Terminal units via the set of access node units and the set of network node units, and supports the control, management, operation and maintenance of the set of smart network terminal units, the set of user device units and the reduced set of agent mobile terminal units, A User Management Centre unit, that communicates with the set of User Device units, via the network control centre unit and the set of smart network terminal units; the User Management Centre unit performs a service definition, control and management of the set of user device units; and it the User Management Centre unit can communicate in multimedia mode with the advanced user devices.

2. The System as in claim 1, having a five levels architecture, for a maximum configuration, and four levels architecture, for a reduced configuration; and these configurations can be dimensioned according to a number of parking spaces to be managed.

3. The System as in claim 1, wherein the advanced User Device unit (UD), comprises the following application specific modules:

a) an Optical Minicamera, for supporting video services;

b) a Vehicle Data Interface, that allows the communication and interaction of the vehicle with other system units, within a smart and connected vehicle context;

c) a Multimedia Processor, to support from a parking operation management up to the monitoring, reporting and security features of the vehicle and the vehicle driver, during the parking operation as well as during the complete parking time;

the User device unit, in advanced configuration, provides Multimedia features.

4. The System as in claim 1, wherein communication of the advanced User device unit is performed by the coordinated and integrated operation of its application specific modules.

5. The System as in claim 1, wherein each of the set of Smart Network Terminal units (SNT) has an architecture that comprises, as application specific modules, in an embodiment:

a) an Optical Camera, to support image and video services;

b) a Video Interface, to route a video signal from the Optical Camera and c) a Digital Multiprocessor, to support the control and management, within a SNT coverage area, of a group of user device units, the vehicle and the vehicle driver, as well as other persons and things; and the Optical Camera, the Video Interface, the Digital Multiprocessor and a Radiofrequency or Optical detector, as complementary ranging detector.

6. The System as in claim 1, wherein each of the set of Smart Network Terminal units supports two operational cases:

a) a Normal Case, that is when correct information is received from the user device unit and b) an Abnormal Case, that is when not correct information is received from the user device unit, including in both cases, the management of all incidences, events and circumstances; and the support of parking related Supplementary Services and persons and things Supplementary Services.

7. A The System as in claim 1, wherein user device unit control and management, in the Normal Case, is performed directly by a Smart Network Terminal unit, according to data received from the User device unit.

8. The System as in claim 1, wherein the user device unit control and management, in the Abnormal Case, including all the incidences, events and circumstances of the User device unit, vehicle and vehicle driver, is realised by the coordinated and integrated operation of the Smart Network Terminal unit specific modules, as defined in claim 5, performing a vehicle identification by means of the vehicle plate number.

9. The System as in claim 1, wherein the set of Smart Network Terminal units sends authorized image and video information, previously selected and authorized, about the parking operation, parking environment, vehicle state, vehicle driver state and other informations about persons and things, to the Network Control Centre unit and the User Management Centre unit, in real time or delayed, and about specific events and circumstances identified by the set of Smart Network Terminal units.

10. The System as in claim 1, wherein the Network Control Centre unit has a modular and scalable architecture, that comprises the following application specific modules, all of them specific for the communication of the set of Smart Network Terminal units: Initialization and Synchronization, Operation, Connection Control, Maintenance, Redundancy and Security, Data Base and User Management Centre Interface.

11. The System as in claim 1, wherein the Network Control Centre unit realises the following specific functions:

Initialization and Synchronization of the set of Smart Network Terminal units,

Connections Control for communication from the set of User Device units and the set of Smart Network terminal units to the User Management Centre, Remote Configuration of the set of User Device units and the set of Smart Network Terminal units, Updating data and programmes load, for the set of User Device units and the set of Smart Network Terminal units, as defined in claim 1, Control capability, through the Smart Network Terminals, of above ten million vehicles and above one million parking spaces.

12. The System as in claim 1, wherein the User Management Centre unit has an architecture that comprises the following application specific modules, all of them specific for the communication of the set of User Device units by means of the set of Smart Network Terminal units, within a Machine to Machine context: User Registration, Identification and Services Control, Corrective Actions, Agents Management, Reports Editing, Data Base and Regulations.

13. The System as in claim 1, wherein the User Management Centre unit, a) supports a parking operation services, in automatic way, including all incidences events and circumstances related to the vehicle and the vehicle driver, b) provides a set of parking Supplementary Services, 24 hours a day, including at least the following: Free Space Management, Space Public Information, in panels and in fixed and mobile terminals (personal/on board), Free Spaces guidance, Location, Watching and Tracking of authorized vehicles, including Interactive Multimedia information, c) supports another Supplementary Services as the Communication, Watching and Tracking of authorized Persons and Things, for the communication is required that the Persons and Things are carrying a User device unit.

14. A Method for the Communication between the following Units: User Devices units (UD), Smart Network Terminals units (SNT), Agent Mobile Terminals units (AMT), Access Nodes units (AN), Network Nodes units (NN), Network Control Centre unit (NCC) and User Management Centre unit (UMC), comprising, in a Normal Case, that is when correct information is received by the SNT unit from a user device unit, the following steps:

a. The SNT sends a broadcast message to a User device unit, within the SNT coverage area, and the SNT waits for an identification message, b. The User device sends an identification message to the SNT and the SNT reports to the UMC, c. The UMC sends to the related SNT an accepted identification message and the SNT indicates correct identification to the UD, d. In case of not correct identification message:

If it is detected by the SNT, the SNT reports to the related UD and to the UMC,

If it is detected by the UMC, the UMC reports to the related SNT and the UD, e. The SNT performs a periodic scanning of UD status data, and the related UD reports on the identification of the user device state and on the incidences, events and circumstances, related to the UD vehicle and a vehicle driver, f. When a parking space has not been released correctly, the related SNT reports to the NCC and UMC, g. Along a parking time period, the set of User device units can interchange either current data or multimedia information with the UMC, in a machine to machine context, h. Along the a. up to g. steps, at any moment and for any system purpose, the SNT can exchange network information with the NCC, i. Along the steps a. up to h., at any moment and for some specific and authorized user management actions, the AMT can communicate with the UD and the UMC current data or complex audio, video, data or multimedia information.

15. The Method as in claim 14, for an Abnormal Case, that is when not correct information is received from the user device unit, with the following complementary steps:

a. The SNT generates internally, by means of the SNT detection media, a message of detected data indicating that a parking space has been occupied, including all incidences, events and circumstances; the SNT performs the detected data processing, obtaining the vehicle plate number; and sends an information message to the UMC;

b. If the identification is correct the SNT goes to a busy state, and if the identification is not correct, or if the SNT is not able to obtain the vehicle plate number, the SNT reports to the UMC for an action, c. When a parking space is released, the SNT generates internally, by means of the SNT detection media a message on a parking space state, including all incidences and circumstances related to the vehicle and the vehicle driver, and the SNT sends an information to the UMC.

16. The System as in claim 1, having a five levels architecture for a maximum configuration that is dimensioned according to a number of parking spaces to be managed.

* * * * *